United States Patent
Kobayashi et al.

(10) Patent No.: US 10,946,360 B2
(45) Date of Patent: Mar. 16, 2021

(54) LAYERED-SUBSTANCE-CONTAINING SOLUTION AND METHOD OF MANUFACTURING SAME

(71) Applicant: ADEKA CORPORATION, Tokyo (JP)

(72) Inventors: Atsushi Kobayashi, Tokyo (JP); Ryo Taniuchi, Tokyo (JP); Yohei Aoyama, Tokyo (JP)

(73) Assignee: ADEKA CORPORATION, Tokyo (JP)

( * ) Notice: Subject to any disclaimer, the term of this patent is extended or adjusted under 35 U.S.C. 154(b) by 0 days.

(21) Appl. No.: 15/559,252

(22) PCT Filed: Mar. 17, 2016

(86) PCT No.: PCT/JP2016/058576
§ 371 (c)(1),
(2) Date: Sep. 18, 2017

(87) PCT Pub. No.: WO2016/148252
PCT Pub. Date: Sep. 22, 2016

(65) Prior Publication Data
US 2018/0085730 A1    Mar. 29, 2018

(30) Foreign Application Priority Data

Mar. 18, 2015 (JP) .............................. JP2015-054556

(51) Int. Cl.
| | | |
|---|---|---|
| *B01J 19/10* | (2006.01) | |
| *B01J 19/12* | (2006.01) | |
| *B01F 17/00* | (2006.01) | |
| *C08J 3/09* | (2006.01) | |
| *C08J 3/28* | (2006.01) | |
| *C08L 101/00* | (2006.01) | |
| *C08J 3/02* | (2006.01) | |
| *C01B 32/19* | (2017.01) | |
| *C01B 17/22* | (2006.01) | |
| *C01B 33/38* | (2006.01) | |
| *C01B 32/205* | (2017.01) | |
| *C01B 33/22* | (2006.01) | |
| *C01B 32/21* | (2017.01) | |
| *C01B 19/00* | (2006.01) | |
| *C01B 33/42* | (2006.01) | |
| *B32B 33/00* | (2006.01) | |

(52) U.S. Cl.
CPC ........... *B01J 19/10* (2013.01); *B01F 17/0085* (2013.01); *B01J 19/129* (2013.01); *B32B 33/00* (2013.01); *C01B 17/22* (2013.01); *C01B 19/007* (2013.01); *C01B 32/19* (2017.08); *C01B 32/205* (2017.08); *C01B 32/21* (2017.08); *C01B 33/22* (2013.01); *C01B 33/38* (2013.01); *C01B 33/42* (2013.01); *C08J 3/02* (2013.01); *C08J 3/09* (2013.01); *C08J 3/28* (2013.01); *C08L 101/00* (2013.01); *B01J* *2219/00047* (2013.01); *B32B 2307/70* (2013.01); *C01B 2204/02* (2013.01); *C01B 2204/04* (2013.01)

(58) Field of Classification Search
None
See application file for complete search history.

(56) References Cited

U.S. PATENT DOCUMENTS

| | | | |
|---|---|---|---|
| 2011/0287316 A1 | 11/2011 | Lu et al. | |
| 2012/0256138 A1 | 10/2012 | Suh et al. | |
| 2012/0261612 A1 | 10/2012 | Suh et al. | |
| 2012/0296012 A1* | 11/2012 | Palmese | C08G 59/184 523/427 |
| 2015/0137027 A1 | 5/2015 | Aida et al. | |
| 2015/0224210 A1 | 8/2015 | Sekitani et al. | |
| 2016/0141620 A1* | 5/2016 | Cairns | H01M 4/133 429/200 |
| 2016/0251489 A1* | 9/2016 | Zhang | C08J 5/18 106/163.01 |

FOREIGN PATENT DOCUMENTS

| | | |
|---|---|---|
| CN | 102712779 A | 10/2012 |
| EP | 2 518 103 A2 | 10/2012 |
| JP | 2008-177385 A | 7/2008 |
| JP | 2008-177526 A | 7/2008 |
| JP | 2015-3967 A | 1/2015 |
| WO | 2010/065346 A1 | 6/2010 |
| WO | 2012/046595 A1 | 4/2012 |
| WO | 2013/172350 A1 | 11/2013 |

(Continued)

OTHER PUBLICATIONS

Jul. 20, 2018 Extended European Search Report issued in European Patent Application No. 16765081.1.
Shaya Mahmoudian, et al., "Bionanocomposite Fibers Based on Cellulose and Montmorillonite Using Ionic Liquid 1-Ethyl-3-Methylimidazolium Acetate", Journal of Materials Science, vol. 50, No. 3, pp. 1228-1236, 2014.
Radisavljevic, B. et al. "Single-Layer MoS2 Transistors". Nature Nanotechnology, vol. 6, pp. 147-150, 2011.
Apr. 12, 2016 International Search Report issued in International Patent Application No. PCT/JP2016/058576.
Wan Jing-Jing; "Ionic Liquid Modified Polymer/Graphite Composites;" A Thesis Submitted for the Degree of Master; South China University of Technology; Guangzhou, China; Mar. 15, 2011.

(Continued)

*Primary Examiner* — Joseph D Anthony
(74) *Attorney, Agent, or Firm* — Oliff PLC

(57) ABSTRACT

A solution containing an ionic liquid, a polymer compound including at least one of a hydrolyzable polymer compound and a thermally-decomposable polymer compound, and a laminate of layered substances is irradiated with at least one of sonic waves and radio waves. Alternatively, a solution containing an ionic liquid, a polymer compound including at least one of a hydrolyzable polymer compound and a thermally-decomposable polymer compound, and a laminate of layered substances is heated.

9 Claims, No Drawings

(56) References Cited

FOREIGN PATENT DOCUMENTS

WO      2014/030556 A1     2/2014

OTHER PUBLICATIONS

Joan Fuller et al.; "Ionic liquid-polymer gel electrolytes from hydrophilic and hydrophobic ionic liquids;" Journal of Electroanalytical Chemistry; vol. 459, Issue 1; Nov. 23, 1998; pp. 29-34.

Shaya Mahmoudian et al.; "Preparation and Thermal Properties of Cellulose/Layered Silicate Montmorillonite Nanocomposites Prepared via Ionic Liquids;" Key Engineering Materials; vols. 471-472; 2011; pp. 786-791.

Aug. 28, 2019 Search Report issued in Chinese Patent Application No. 201680015865.2.

\* cited by examiner

LAYERED-SUBSTANCE-CONTAINING SOLUTION AND METHOD OF MANUFACTURING SAME

TECHNICAL FIELD

The invention relates to a layered-substance-containing solution containing an ionic liquid together with a layered substance, and a method of manufacturing the same.

BACKGROUND ART

A substance (a layered substance) having a layered structure exhibits characteristic physical properties resulting from the layered structure. Many researchers have been therefore conducting research on various layered substances.

For example, there has been proposed to use a layered substance called a "nanosheet" to improve performance of electronic devices (for example, refer to Non Patent Literature 1). A layered substance having a plurality of layers (two to five layers) is used as the nanosheet, as well as a single-layer (one-unit layer) layered substance.

The layered substances are generally present in a state in which a plurality of layered substances are laminated (a laminate). Accordingly, in order to peel off the layered substance from the laminate, there has been proposed a method such as a physical peeling method using an adhesive tape, a chemical peeling method using an oxidation method, and a method of irradiating the laminate with ultrasonic waves, etc. in an organic solvent (for example, refer to Patent Literature 1).

CITATION LIST

Non Patent Literature

Non Patent Literature 1: B. Radisavljevic et al., Nature Nanotech, 6, pp. 147 to 150, 2011

Patent Literature

Patent Literature 1: International Publication No. WO 2013/172350

SUMMARY OF INVENTION

As a layered substance is attracting rising attention, it is desired to establish a technique that is able to obtain the layered substance.

It is therefore desirable to provide a layered-substance-containing solution that allows for easy obtainment of a layered substance, and a method of manufacturing such a layered-substance-containing solution.

As a result of intensive studies to achieve an object mentioned above, the inventors have found out that the foregoing issue is solved by preparing a solution including an ionic liquid and a polymer compound including at least one of a hydrolyzable polymer compound and a thermally-decomposable polymer, and irradiating the prepared solution with sonic waves, etc. or heating the prepared solution.

The invention is based on the foregoing findings. A layered-substance-containing solution according to one embodiment of the invention includes: an ionic liquid; a polymer compound including at least one of a hydrolyzable polymer compound and a thermally-decomposable polymer compound; and a layered substance.

Further, a method of manufacturing a layered-substance-containing solution according to one embodiment of the invention includes irradiating a solution with at least one of sonic waves and radio waves, in which the solution contains an ionic liquid, a polymer compound including at least one of a hydrolyzable polymer compound and a thermally-decomposable polymer compound, and a laminate of layered substances.

Alternatively, a method of manufacturing a layered-substance-containing solution according to one embodiment of the invention includes heating a solution containing an ionic liquid, a polymer compound including at least one of a hydrolyzable polymer compound and a thermally-decomposable polymer compound, and a laminate of layered substances.

Herein, the "layered substance" of the invention is a layered thin substance. The "layered substance" may contain only one kind of element as a constituent element, or may contain two or more kinds of elements as constituent elements.

It is to be noted that the "layered substance" may be a single layer or a multilayer. The number of layers of the multilayer layered substance is sufficiently small. Specifically, the number of layers of the multilayer layered substance is nine or less, and may be preferably four or less. It is to be noted that, in the multilayer layered substance, part of a plurality of layers may contain two or more kinds of elements as constituent elements, or all of the layers (each of the layers) may contain two or more kinds of elements as constituent elements. In contrast, the "laminate of layered substances" of the invention is a structure in which a plurality of layered substances are laminated, and is therefore a multilayer (ten or more layers).

According to the layered-substance-containing solution and the method of manufacturing the layered-substance-containing solution according to the embodiments of the invention, the solution that contains the ionic liquid, the polymer compound including at least one of the hydrolyzable polymer compound and the thermally-decomposable polymer, and the laminate of the layered substances is irradiated with sonic waves, etc. or is heated. This allows the layered substance to be peeled off from the laminate easily, and the layered substance peeled off is therefore dispersed in the ionic liquid at high concentration. Hence, it is possible to easily obtain the layered substance.

DESCRIPTION OF EMBODIMENTS

A detailed description is given below of one embodiment of the invention. An order of the description is as follows. It is to be noted, however, that the details of the invention are not limited to embodiments to be described below, and are modifiable as appropriate.

1. Layered-substance-containing Solution
    1-1. Ionic Liquid
        1-1-1. Cation
        1-1-2. Anion
    1-2. Polymer Compound
        1-2-1. Hydrolyzable Polymer Compound
        1-2-2. Thermally-decomposable Polymer Compound
    1-3. Layered Substance
    1-4. Other Materials 2. Method of Manufacturing Layered-substance-containing Solution
  2-1. Preparation of Layered-substance-containing Solution
  2-2. Purification of Layered-substance-containing Solution
3. Workings and Effects <1. Layered-Substance-Containing Solution>

First, a description is given of a configuration of a layered-substance-containing solution.

The layered-substance-containing solution contains an ionic liquid, a polymer compound, and a layered substance. The layered substance is dispersed in the ionic liquid.

<1-1. Ionic Liquid>

The ionic liquid is a liquid salt. The ionic liquid includes a cation and an anion.

The ionic liquid is not particularly limited in its kind, and may include one or more kinds of any ionic liquid.

Details of each of the cation and the anion are as described below. Specifically, the ionic liquid is a compound derived from combination of one or more kinds of a series of cations described below and one or more kinds of a series of anions described below. It is to be noted that the cation is not limited in its kind to the series of cations described below, and the anion is not limited in its kind to the series of anions described below.

The ionic liquid of the invention also encompasses a compound that forms a salt in a molecule. Specific examples of such an ionic liquid may include (methoxycarbonyl sulfamoyl)triethylammonium hydroxide.

The content of the ionic liquid in the layered-substance-containing solution is not particularly limited; however, the content of the ionic liquid in the layered-substance-containing solution may be preferably from 5 wt % to 98 wt % both inclusive, and may be more preferably from 25 wt % to 80 wt % both inclusive.

<1-1-1. Cation>

The cation includes one or more kinds of any positive ion.

Examples of the cation may include an imidazolium-based ion, a pyridinium-based ion, an ammonium-based ion, a pyrrolidinium-based ion, a choline-based ion, a phosphonium-based ion, a sulfonium-based ion, and a complex ion thereof.

Specific examples of the imidazolium-based ion may include 1-ethyl-3-methylimidazolium, 1-hexyl-3-methylimidazolium, 1-allyl-3-methylimidazolium, 1,2-dimethyl-3-propylimidazolium, 1-butyl-3-methylimidazolium, 1-ethyl-2,3-dimethylimidazolium, 1-butyl-2,3-dimethylimidazolium, 1,3-dimethoxy-2-methylimidazolium, 1-decyl-3-methylimidazolium, 1-(2-hydroxyethyl)-3-methylimidazolium, 1-methyl-3-vinylimidazolium, 1,3-diethoxyimidazolium, 1-benzyl-3-methylimidazolium, 1-ethyl-3-vinylimidazolium, 1-methyl-3-(2',3'-epoxypropyl) imidazolium, 1,3-bis(cyanomethyl) imidazolium, 1,3-bis(3-cyanopropyl) imidazolium, and a compound represented by the following Formula (1).

[Chemical Formula 1]

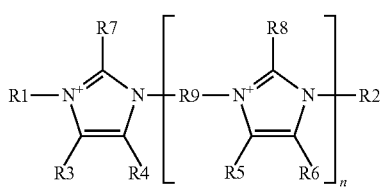

(1)

(Each of R1 and R2 is any of a monovalent unsubstituted hydrocarbon group and a monovalent substituent hydrocarbon group. Each of R3 to R8 is any of a hydrogen group, a monovalent unsubstituted hydrocarbon group, and a monovalent substituent hydrocarbon group. R9 is any of divalent groups represented by the following Formula (2) and the following Formula (3). n is an integer of 0 or greater.)

[Chemical Formula 2]

(2)

(Each of R10 and R11 is any of a divalent unsubstituted hydrocarbon group and a divalent substituent hydrocarbon group. Z1 is any of an ether bond (—O—), a sulfide bond (—S—), a divalent unsubstituted aromatic hydrocarbon group, and a divalent substituent aromatic hydrocarbon group. m1 is an integer of 1 or greater.)

[Chemical Formula 3]

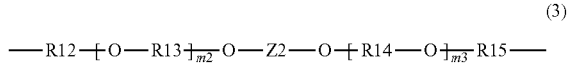

(3)

(Each of R12 to R15 is any of a divalent unsubstituted hydrocarbon group and a divalent substituent hydrocarbon group. Z2 is any of a divalent unsubstituted aromatic hydrocarbon group and a divalent substituent aromatic hydrocarbon group. Each of m2 and m3 is an integer of 1 or greater.)

Each of R1 and R2 is not particularly limited in its kind as long as each of R1 and R2 is any of the monovalent unsubstituted hydrocarbon group and the monovalent substituent hydrocarbon group. Each of the monovalent unsubstituted hydrocarbon group and the monovalent substituent hydrocarbon group may be a straight-chain group or a branched group having one or more side chains. It is to be noted that R1 and R2 may be groups of the same kind or groups of kinds different from each other.

The monovalent unsubstituted hydrocarbon group is a generic term for a monovalent group including carbon and hydrogen. Examples of the monovalent unsubstituted hydrocarbon group may include an alkyl group, an alkenyl group, an alkynyl group, a cycloalkyl group, an aryl group, and a monovalent group in which two or more kinds of the forgoing groups are bound.

Specific examples of the alkyl group may include a methyl group, an ethyl group, a propyl group, an isopropyl group, a butyl group, an isobutyl group, an s-butyl group, a t-butyl group, an amyl group, an isoamyl group, a t-amyl group, a hexyl group, and a heptyl group. Specific examples of the alkenyl group may include a vinyl group and an allyl group. Specific examples of the alkynyl group may include an ethynyl group. Specific examples of the cycloalkyl group may include a cyclopropyl group, a cyclobutyl group, a cyclopentyl group, a cyclohexyl group, a cycloheptyl group, and a cyclooctyl group. Specific examples of the aryl group may include a phenyl group and a naphthyl group.

The monovalent unsubstituted hydrocarbon group is not particularly limited in its carbon number; however, it may be preferable that the carbon number of the monovalent unsubstituted hydrocarbon group not be extremely large. Specifically, the carbon number of each of the alkyl group, the alkenyl group, and the alkynyl group may be preferably from 1 to 7 both inclusive. The carbon number of each of the cycloalkyl group and the aryl group may be preferably 6 or 7. A reason for this is that dispersibility, etc. of the layered substance are improved thereby.

The monovalent substituent hydrocarbon group is derived from introduction of one or more substituent groups into a monovalent unsubstituted hydrocarbon group. Specifically, the monovalent substituent hydrocarbon group is derived from substitution, by one or more substituent groups, of one or more hydrogen atoms in the monovalent unsubstituted hydrocarbon group. Only one kind of the substituent group may be used, or two or more kinds of the substituent groups may be used.

The substituent group is not particularly limited in its kind. Examples of the substituent group may include a halogen atom, a cyano group (—CN), a nitro group (—NO$_2$), a hydroxyl group (—OH), a thiol group (—SH), a carboxyl group (—COOH), an aldehyde group (—CHO), an amino group (—NR$_2$), a salt thereof, and an ester thereof. Examples of the halogen atom may include a fluorine atom (F), a chlorine atom (Cl), a bromine atom (Br), and an iodine atom (I). Each of the two Rs in the amino group (—NR$_2$) is any of a hydrogen atom and the monovalent unsubstituted hydrocarbon group. The two Rs may be groups of the same kind or groups of kinds different from each other. Details of the monovalent unsubstituted hydrocarbon group are as described above. It is a matter of course that the kind of the substituent group may be any group other than those described above.

Each of R3 to R8 is not particularly limited in its kind as long as each of R3 to R8 is any of the hydrogen atom, the monovalent unsubstituted hydrocarbon group, and the monovalent substituent hydrocarbon group. R3 to R8 may be groups of the same kind or groups of kinds different from each other. It is a matter of course that part of R3 to R8 may be groups of the same kind. Details of the monovalent unsubstituted hydrocarbon group and the monovalent substituent hydrocarbon group are as described above.

A value of n that determines the number of repeating units is not particularly limited as long as the value of n is an integer of 0 or greater. In other words, the value of n may be 0, or may be an integer of 1 or greater. n may be preferably an integer of 30 or smaller, in particular. A reason for this is that dispersibility, etc. of the layered substance are improved thereby.

Each of R7 and R8 is not particularly limited in its kind as long as each of R7 and R8 is any of the hydrogen atom, the monovalent unsubstituted hydrocarbon group, and the monovalent substituent hydrocarbon group. R7 and R8 may be groups of the same kind or groups of kinds different from each other. When a plurality of R8s are included as n is an integer of 2 or greater, part of R7 and R8s may be groups of the same kind. Details of each of the monovalent unsubstituted hydrocarbon group and the monovalent substituent hydrocarbon group are as described above.

In particular, one or more of R7 and R8s may each be preferably the monovalent unsubstituted hydrocarbon group. In this case, the number of the monovalent unsubstituted hydrocarbon group may be only one or two or more as long as the monovalent unsubstituted hydrocarbon group is included in R7 and R8s. Specifically, when the plurality of R8s are included, R7 may be the monovalent unsubstituted hydrocarbon group, or one or more of the plurality of R8s may be the monovalent unsubstituted hydrocarbon groups. A reason why one or more of R7 and R8s are the monovalent unsubstituted hydrocarbon groups is that dispersibility, etc. of the layered substance are improved in the case where R7 and R8s include the monovalent unsubstituted hydrocarbon group, compared with a case where R7 and R8s include no monovalent unsubstituted hydrocarbon group.

More specifically, when the value of n is 0, R7 may be preferably the monovalent unsubstituted hydrocarbon group. In an alternative case where the value of n is 1 or greater, one or more of R7 and R8s may be the monovalent unsubstituted hydrocarbon groups; however, it may be preferable that all of R7 and R8s be the monovalent unsubstituted hydrocarbon groups, in particular. A reason for this is that dispersibility, etc. of the layered substance are improved in any of the foregoing cases.

It is to be noted that the monovalent unsubstituted hydrocarbon group that corresponds to one or more of R7 and R8s is not particularly limited in its kind as long as the monovalent unsubstituted hydrocarbon group that corresponds to one or more of R7 and R8s is any of the foregoing candidates for the monovalent unsubstituted hydrocarbon group. In particular, the monovalent unsubstituted hydrocarbon group may be preferably an alkyl group, irrespective of the value of n. A reason for this is that dispersibility, etc. of the layered substance are improved thereby.

R9 may be the divalent group represented by Formula (2), or may be the divalent group represented by Formula (3). When a plurality of R9s are included as n is an integer of 2 or greater, the plurality of R9s may be groups of the same kind or may be groups of kinds different from each other. It is a matter of course that part of the plurality of R9s may be groups of the same kind.

Each of R10 and R11 is not particularly limited in its kind as long as each of R10 and R11 is any of the divalent unsubstituted hydrocarbon group and the divalent substituent hydrocarbon group. Each of the divalent unsubstituted hydrocarbon group and the divalent substituent hydrocarbon group may be a straight-chain group or a branched group having one or more side chains. R10 and R11 may be groups of the same kind or groups of kinds different from each other. When a plurality of R10s are included as m1 is 2 or greater, the plurality of R10s may be groups of the same kind or may be groups of kinds different from each other. It is a matter of course that part of R10s may be groups of the same kind.

The divalent unsubstituted hydrocarbon group is a generic term for a divalent group including carbon and hydrogen. Examples of the divalent unsubstituted hydrocarbon group may include an alkylene group, an alkenylene group, an alkynylene group, a cycloalkylene group, an arylene group, and a divalent group in which two or more kinds of the foregoing groups are bound.

Specific examples of the alkylene group may include a methane-1,1-diyl group, an ethane-1,2-diyl group, a propane-1,3-diyl group, a butane-1,4-diyl group, an ethane-1,1-diyl group, a propane-1,2-diyl group, a butane-1,2-diyl group, a butane-1,3-diyl group, and a butane-2,3-diyl group. Specific examples of the alkenylene group may include a vinylene group. Specific examples of the alkynylene group may include an ethynylene group. Specific examples of the cycloalkylene group may include a cyclopropylene group and a cyclobutylene group. Specific examples of the arylene group may include a phenylene group and a naphthylene group.

The divalent unsubstituted hydrocarbon group is not particularly limited in its carbon number; however, it may be preferable that the carbon number of the divalent unsubstituted hydrocarbon group not be extremely large. Specifically, the carbon number of each of the alkylene group, the alkenylene group, and the alkynylene group may be preferably from 1 to 4 both inclusive. The carbon number of each of the cycloalkylene group and the arylene group may be preferably 6. A reason for this is that dispersibility, etc. of the layered substance are improved thereby.

The divalent substituent hydrocarbon group is derived from introduction of one or more substituent groups into a divalent unsubstituted hydrocarbon group. It is to be noted that details of the kind of the substituent group, etc. are as described above.

Z1 is not particularly limited in its kind as long as Z1 is any of the ether bond, the sulfide bond, the divalent unsubstituted aromatic hydrocarbon group, and the divalent substituent aromatic hydrocarbon group. When a plurality of Z1s are included as m1 is 2 or greater, the plurality of Z1s may be groups of the same kind or may be groups of kinds different from each other. It is a matter of course that part of the plurality of Z1s may be groups of the same kind.

The divalent unsubstituted aromatic hydrocarbon group is a generic term for a divalent group including carbon and hydrogen and having a cyclic conjugated structure. Examples of the divalent unsubstituted aromatic hydrocarbon group may include an arylene group. Specific examples of the arylene group may include a monocyclic phenylene ring and a polycyclic naphthylene group.

The divalent unsubstituted aromatic hydrocarbon group has two atomic bondings; however, the positions of the two atomic bondings are not particularly limited. To give an example, when the divalent unsubstituted aromatic hydrocarbon group is a phenylene group, a position of one of the atomic bondings with respect to a position of the other may be in an ortho-position, a meta-position, or a para-position. In particular, the position of the other atomic bonding may be preferably in the para-position. A reason for this is that chemical stability of the ionic liquid is improved thereby, and dispersibility, etc. are also improved thereby.

The divalent substituent aromatic hydrocarbon group is derived from introduction of one or more substituent groups into a divalent unsubstituted aromatic hydrocarbon group. It is to be noted that details of the kind of the substituent group, etc. are as described above.

A value of m1 that determines the number of repeating units is not particularly limited as long as the value of m1 is an integer of 1 or greater. m1 may be preferably an integer of 30 or smaller, in particular. A reason for this is that dispersibility, etc. of the layered substance is improved thereby.

Each of R12 to R15 is not particularly limited in its kind as long as each of R12 to R15 is any of the divalent unsubstituted hydrocarbon group and the divalent substituent hydrocarbon group. R12 to R15 may be groups of the same kind or groups of kinds different from each other. It is a matter of course that part of R12 to R15 may be groups of the same kind. When a plurality of R13s are included as m2 is an integer of 2 or greater, the plurality of R13s may be groups of the same kind or may be groups of kinds different from each other. Further, part of the plurality of R13s may be groups of the same kind. When a plurality of R14s are included as m3 is an integer of 2 or greater, the plurality of R14s may be groups of the same kind or may be groups of kinds different from each other. Further, part of the plurality of R14s may be groups of the same kind. Details of each of the divalent unsubstituted hydrocarbon group and the divalent substituent hydrocarbon group are as described above.

Z2 is not particularly limited in its kind as long as Z2 is any of the divalent unsubstituted aromatic hydrocarbon group and the divalent substituent aromatic hydrocarbon group. Details of each of the divalent unsubstituted aromatic hydrocarbon group and the divalent substituent aromatic hydrocarbon group are as described above.

A value of each of m2 and m3 that determines the number of repeating units is not particularly limited as long as the value of each of m2 and m3 is an integer of 1 or greater. Each of m2 and m3 may be preferably an integer of 30 or smaller, in particular. A reason for this is that dispersibility, etc. of the layered substance are improved thereby.

In particular, the cation has a composition that may preferably satisfy the following conditions. A reason for this is that synthesis is easily performed and dispersibility, etc. of the layered substance are improved thereby.

Each of R1 and R2 positioned at respective ends may be preferably a straight-chain alkyl group. More specifically, each of R1 and R2 may be preferably a group such as a methyl group, an ethyl group, an n-propyl group, an n-butyl group, an n-pentyl group, and an n-hexyl group. Each of R3 to R6 introduced into each imidazolium ring may be preferably a hydrogen atom. Each of R7 and R8 introduced into each imidazolium ring may be preferably a straight-chain alkyl group. More specifically, each of R7 and R8 introduced into each imidazolium ring may be preferably a group such as a methyl group, an ethyl group, an n-propyl group, an n-butyl group, an n-pentyl group, and an n-hexyl group. Each of R10 to R15 to be introduced into a group coupling imidazolium rings to each other may be preferably a straight-chain alkylene group. More specifically, each of R10 to R15 introduced into a group coupling imidazolium rings to each other may be preferably an ethylene group.

A value of n that determines the number of repeating units may be preferably an integer from 0 to 2 both inclusive. A reason for this is that the excessively-large value of n increases viscosity of the ionic liquid, which may possibly make it difficult for the layered substance to be peeled off in a process of manufacturing the layered-substance-containing solution which will be described later. Another reason is that it may be possibly more difficult to perform a purification process of the layered-substance-containing solution when necessary.

A value of m1 may be preferably an integer from 1 to 5 both inclusive. A value of each of m2 and m3 may be preferably 2 or 3.

It is to be noted that any one or more kinds of linking groups described below may be introduced into the foregoing monovalent unsubstituted hydrocarbon group.

The linking group is not particularly limited in its kind as long as the linking group is a divalent group. Specific examples of the linking group may include —O—, —C(=O)—, —C(=O)—O—, —O—C(=O)—, —NR—, and —S—. R is any of a hydrogen atom and the monovalent unsubstituted hydrocarbon group.

The linking group described here is so introduced to the monovalent unsubstituted hydrocarbon group that a carbon chain is fragmented once or more times. To give an example, introduction of a single ether group into an ethyl group (—$CH_2$—$CH_3$) results in —$CH_2$—O—$CH_3$. To give another example, introduction of two ether groups into a propylene group (—$CH_2$—$CH_2$—$CH_3$) results in —$CH_2$—O—$CH_2$—O—$CH_3$.

Such introduction of the linking group is also similarly applicable to each of the monovalent substituent hydrocarbon group, the divalent unsubstituted hydrocarbon group, the divalent substituent hydrocarbon group, the divalent unsubstituted aromatic hydrocarbon group, and the divalent substituent aromatic hydrocarbon group.

To give an example, introduction of a single ether group into an ethylene group (—$CH_2$—$CH_2$—) results in —CH$_2$—O—CH$_2$—. To give another example, introduction of two ether groups in a propylene group (—CH$_2$—CH$_2$—CH$_2$—) results in —CH$_2$—O—CH$_2$—O—CH$_2$—.

Specific examples of the pyridinium-based ion may include 1-butyl-4-methylpyridinium, 1-butylpyridinium, 1-(3-cyanopropyl)pyridinium, and 1-butyl-3-methylpyridinium.

Specific examples of the ammonium-based ion may include tetraethylammonium, tetrabutylammonium, tetrahexylammonium, tetraheptylammonium, tetrakis(decyl)ammonium, tetradodecylammonium, tetrahexadecylammonium, triethylmethylammonium, tributylmethylammonium, methyltrioctadecylammonium, trioctylmethylammonium, benzyldimethyltetradecylammonium, tris(2-hydroxyethyl) methylammonium, and 2-hydroxyethyltrimethylammonium.

Specific examples of the pyrrolidinium-based ion may include 1-butyl-1-methylpyrrolidinium and 1-ethyl-1-methylpyrrolidinium.

Specific examples of the choline-based ion may include choline.

Specific examples of the phosphonium-based ion may include tetrabutylphosphonium, tributylmethylphosphonium, trihexyltetradecylphosphonium, and 3-(triphenylphosphonio) propane-1-sulfonic acid.

Specific examples of the sulfonium-based ion may include triethylsulfonium and cyclopropyldiphenylsulfonium.

The complex ion includes one or more kinds of skeletons of the foregoing series of ions (candidates for the cation).

For example, the complex ion may include a skeleton (an imidazolium skeleton) of the imidazolium-based ion and a skeleton (a pyridinium skeleton) of the pyridinium-based ion. Specific example of such an ion may include the following compound A.

[Chemical Formula 4]

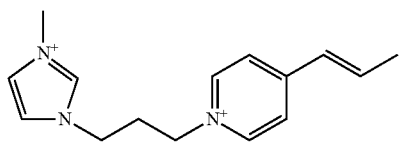

Compound A

In particular, the imidazolium-based ion may be preferable. A reason for this is that dispersibility, etc. of the layered substance are improved thereby.

<1-1-2. Anion>

The anion includes one or more kinds of any negative ion.

The negative ion may be represented by pAn$^{q-}$, for example, where An$^{q-}$ is a q-valent negative ion. p is a coefficient necessary to maintain neutrality of the ionic liquid as a whole. A value of p is determined depending on the kind of the negative ion. The product (p×q) of p and q is equal to a valence of the cation as a whole.

Examples of a monovalent negative ion may include a halogen ion, an inorganic ion, an organic sulfonate-based ion, and an organic phosphate-based ion.

Specific examples of the halogen ion may include a chlorine ion (Cl$^-$), a bromine ion (Br$^-$), an iodine ion (I$^-$), and a fluorine ion (F$^-$).

Specific examples of the inorganic ion may include a nitrate anion (NO$_3^-$), a perchlorate ion (ClO$_4^-$), a chlorate ion (ClO$_3^-$), a thiocyanate ion (SCN$^-$), a hexafluorophosphate ion (PF$_6^-$), a hexafluoroantimonate ion (SbF$_6^-$), and a boron tetrafluoride ion (BF$_4^-$).

Specific examples of the organic sulfonate-based ion may include an ethanesulfonate ion, a benzenesulfonate ion, a toluenesulfonate ion, a methanesulfonate ion, a trifluoromethanesulfonate ion, a diphenylamine-4-sulfonate ion, a 2-amino-4-methyl-5-chlorobenzenesulfonate ion, and a 2-amino-5-nitrobenzenesulfonate ion. In addition, the organic sulfonate-based ion may be any of organic sulfonate-based ions disclosed in Japanese Unexamined Patent Application Publication No. H8-253705, Japanese Unexamined Patent Application Publication (Japanese Translation of PCT Application) No. 2004-503379, Japanese Unexamined Patent Application Publication No. 2005-336150, International Publication No. WO 2006/28006, etc.

Specific examples of the organic phosphate-based ion may include a dibutyl phosphate ion, an octyl phosphate ion, a dodecyl phosphate ion, an octadecyl phosphate ion, a phenyl phosphate ion, a nonylphenyl phosphate ion, and a 2,2'-methylenebis(4,6-di-tert-butylphenyl)phosphonate ion.

In addition, specific examples of the monovalent negative ion may include a bis(trifluoromethanesulfonyl) imidic acid ion ((CF$_3$SO$_2$)$_2$N$^-$), a bis(perfluoroethanesulfonyl) imide ion ((C$_2$F$_5$SO$_2$)$_2$N$^-$), a bis(perfluorobutanesulfonyl) imide ion ((C$_4$F$_9$SO$_2$)$_2$N$^-$), a perfluoro-4-ethylcyclohexanesulphonate ion, a tetrakis(pentafluorophenyl) borate ion, a tris (fluoroalkylsulfonyl) carbo ion, dicyanamide, an acetate anion, trifluoroacetate anion, and a dibenzoyl tartrate anion.

Specific examples of the divalent negative ion may include a benzenedisulfonate ion and a naphthalenedisulfonate ion.

In particular, the anion may be preferably any of the chlorine ion, the bromine ion, the hexafluorophosphate ion, the tetrafluoroborate ion, and the bis(trifluoromethanesulfonyl) imidic acid ion, and may be more preferably the hexafluorophosphate ion. A reason for this is that dispersibility, etc. of the layered substance are improved thereby.

<1-2. Polymer Compound>

The polymer compound includes one or both of a hydrolyzable polymer compound and a thermally-decomposable polymer compound. In other words, the polymer compound may include only the hydrolyzable polymer compound, may include only the thermally-decomposable polymer compound, or may include both of the hydrolyzable polymer compound and the thermally-decomposable polymer compound.

<1-2-1. Hydrolyzable Polymer Compound>

The hydrolyzable polymer compound is a polymer compound that has hydrolyzability, i.e., properties that cause the hydrolyzable polymer compound to be decomposed as a result of a reaction with water. The hydrolyzable polymer compound includes one or more kinds of polymer compounds having the hydrolyzability.

A reason why the polymer compound includes the hydrolyzable polymer compound is that the layered substance is peeled off from a layered laminate more easily in a process of manufacturing the layered-substance-containing solution which will be described later, compared with a case where the polymer compound includes no hydrolyzable polymer compound.

The hydrolyzable polymer compound includes, in its molecular structure, one or more kinds of specific groups (reactive groups) that are able to react with water, and thereby obtains the foregoing hydrolyzability.

Examples of the reactive group may include an ether bond (—O—), a sulfide bond (—S—), an ester bond (—C(=O)—O—), an amide bond (—C(=O)—NR—), a carbonate bond (—O—C(=O)—O—), a urea bond (—NR—C(=O)—NR—), and an imide bond (—C(=O)—NR—C(=O)—), where R is a hydrogen atom or an alkyl group. When the reactive group includes two Rs, the two Rs may be groups of the same kind or groups of kinds different from each other.

Specific examples of the hydrolyzable polymer compound including a single kind of reactive group are as follows.

Specific examples of the hydrolyzable polymer compound including the ether bond may include polyalkylene glycol (PEG), epoxy resin, vinylon, polyacetal (POM), and polysaccharide derivative. Examples of the polyalkylene glycol may include polyethylene glycol, polypropylene glycol, and polytetramethylene glycol. Examples of the polysaccharide derivative may include dextrin, pectin, guar gum, methyl cellulose (MC), carboxymethyl cellulose (CMC), glucan, and carrageenan.

Specific examples of the hydrolyzable polymer compound including the sulfide bond may include polythioether. Specific examples of the polythioether may include polyphenylene sulfide and polythioether sulfone.

Specific examples of the hydrolyzable polymer compound including the ester bond may include polybutylene terephthalate (PBT), polyethylene terephthalate (PET), polyethylene isophthalate (PEI), polyhexylene terephthalate, PET/PEI copolymer, polyarylate, polybutylene naphthalate, polyethylene naphthalate, and liquid crystal polyester.

Specific examples of the hydrolyzable polymer compound including the amide bond may include collagen, nylon, and derivatives thereof.

Specific examples of the hydrolyzable polymer compound including the carbonate bond may include polycarbonate resin.

Specific examples of the hydrolyzable polymer compound including the urea bond may include polyurea resin.

Specific examples of the hydrolyzable polymer compound including the imide bond may include polyimide resin.

The hydrolyzable polymer compound including two kinds of reactive groups may be a compound involving a combination of two or more kinds of the foregoing series of hydrolyzable polymer compounds each including the single kind of reactive group, for example. Specific example of such a compound may include polyether polyurethane, polyamide imide, polyether imide, and polyether ether ketone.

In particular, the reactive group may be preferably the ether bond. A reason for this is that the layered substance is peeled off from the layered laminate more easily in the process of manufacturing the layered-substance-containing solution.

It is to be noted that the hydrolyzable polymer compound may be preferably dispersible or dissolvable in the ionic liquid. Further, when the layered-substance-containing solution contains other material (a solvent) which will be described later, the hydrolyzable polymer compound may be preferably dispersible or dissolvable in the solvent.

The hydrolyzable polymer compound is not particularly limited in its molecular weight (the weight-average molecular weight); however, the molecular weight of the hydrolyzable polymer compound may be preferably from 600 to 70000 both inclusive, and may be more preferably from 2000 to 40000 both inclusive, for example. A reason for this is that the hydrolyzable polymer compound is dispersed or dissolved easily thereby in the layered-substance-containing solution.

The hydrolyzable polymer compound is not particularly limited in its content in the layered-substance-containing solution; however, the content of the hydrolyzable polymer compound in the layered-substance-containing solution may be preferably from 5 wt % to 95 wt % both inclusive, and may be more preferably from 20 wt % to 75 wt % both inclusive.

<1-2-2. Thermally-decomposable Polymer Compound>

The thermally-decomposable polymer compound is a polymer compound that has properties that cause the thermally-decomposable polymer compound to be decomposed as a result of heat. The thermally-decomposable polymer includes one or more kinds of polymer compounds having the thermal decomposability.

More specifically, the thermally-decomposable polymer compound may preferably include one or more kinds of compounds each causing a decrease in weight at a temperature of 180 degrees Celsius or lower, preferably, at a temperature of 150 degrees Celsius or lower, when the weight (the mass) is measured by thermogravimetry (TG). The temperature at which the decrease in weight is caused is not particularly limited as long as the temperature is 180 degrees Celsius or lower, preferably, 150 degrees Celsius or lower.

A reason why the polymer compound includes the thermally-decomposable polymer compound is that the layered substance is peeled off from the layered laminate more easily in the process of manufacturing the layered-substance-containing solution which will be described later, compared with a case where the polymer compound includes no thermally-decomposable polymer compound.

The thermally-decomposable polymer compound may be a thermally-decomposable compound (a polymer) that is obtainable by a polymerization reaction using one or more kinds of monomers and satisfies the foregoing conditions related to the decrease in weight, for example. The thermally-decomposable polymer compound may be a homopolymer, or may be a copolymer. The monomer is not particularly limited in its kind; however, examples of the monomer may include acrylate esters, methacrylate esters, acrylic amides, methacrylic amides, vinyl esters, styrenes, acrylic acid, methacrylic acid, acrylonitril, maleic anhydride, and maleinimide.

Specific examples of the acrylate esters may include methyl acrylate, ethyl acrylate, n-propyl acrylate, i-propyl acrylate, n-butyl acrylate, i-butyl acrylate, sec-butyl acrylate, t-butyl acrylate, amyl acrylate, 2-ethylhexyl acrylate, dodecyl acrylate, chloroethyl acrylate, 2-hydroxyethyl acrylate, 2-hydroxypropyl acrylate, 2-hydroxypentyl acrylate, cyclohexyl acrylate, allyl acrylate, trimethylol propane monoacrylate, pentaerythritol monoacrylate, benzyl acrylate, methoxybenzyl acrylate, chlorobenzyl acrylate, hydroxybenzyl acrylate, hydroxyphenetyl acrylate, dihydroxyphenetyl acrylate, furfuryl acrylate, tetrahydrofurfuryl acrylate, phenyl acrylate, hydroxyphenyl acrylate, chlorophenyl acrylate, sulfamoylphenyl acrylate, and 2-(hydroxyphenylcarbonyloxy) ethyl acrylate.

Specific examples of the methacrylate esters may include methyl methacrylate, ethyl methacrylate, n-propyl methacrylate, i-propyl methacrylate, n-butyl methacrylate, i-butyl methacrylate, sec-butyl methacrylate, t-butyl methacrylate, amyl methacrylate, 2-ethylhexyl methacrylate, dodecyl methacrylate, chloroethyl methacrylate, 2-hydroxyethyl methacrylate, 2-hydroxypropyl methacrylate, 2-hydroxypentyl methacrylate, cyclohexyl methacrylate, allyl methacrylate, trimethylol propane monomethacrylate, pentaerythritol monomethacrylate, benzyl methacrylate, methoxybenzyl methacrylate, chlorobenzyl methacrylate, hydroxybenzyl methacrylate, hydroxyphenetyl methacrylate, dihydroxyphenetyl methacrylate, furfuryl methacrylate, tetrahydrofurfuryl methacrylate, phenyl methacrylate, hydroxyphenyl methacrylate, chlorophenyl methacrylate, sulfamoylphenyl methacrylate, and 2-(hydroxyphenylcarbonyloxy) ethyl methacrylate.

Specific examples of the acrylic amides may include acrylamide, N-methylacrylamide, N-ethylacrylamide, N-propylacrylamide, N-butylacrylamide, N-benzylacrylamide, N-hydrozyethylacrylamide, N-phenylacrylamide, N-tolylacrylamide, N-(hydroxyphenyl)acrylamide, N-(sulfamoylphenyl)acrylamide, N-(phenylsulfonyl)acrylamide, N-(tolylsulfonyl)acrylamide, N,N-dimethylacrylamide, N-methyl-N-phenylacrylamide, and N-hydroxyethyl-N-methylacrylamide.

Specific examples of the methacrylamides may include methacrylamide, N-methylmethacrylamide, N-ethylmethacrylamide, N-propylmethacrylamide, N-butylmethacrylamide, N-benzylmethacrylamide, N-hydrozyethlmethacrylamide, N-phenylmethacrylamide, N-tolylmethacrylamide, N-(hydroxyphenyl)methacrylamide, N-(sulfamoylphenyl)methacrylamide, N-(phenylsulfonyl)methacrylamide, N-(tolylsulfonyl)methacrylamide, N, N-dimethylmethacrylamide, N-methyl-N-phenylmethacrylamide, and N-hydroxyethyl-N-methylmethacrylamide.

Specific examples of the vinyl esters may include vinyl acetate, vinyl butyrate, and vinyl benzoate.

Specific examples of the styrenes may include styrene, methylstyrene, dimethylstyrene, trimethyl styrene, ethylstyrene, propylstyrene, cyclohexylstyrene, chloromethylstyrene, trifluoromethylstyrene, ethoxymethylstyrene, acetoxymethyl styrene, methoxystyrene, dimethoxystyrene, chrolostyrene, dichrolostyrene, bromostyrene, iodostyrene, fluorostyrene, and carboxystyrene.

More specifically, the thermally-decomposable polymer compound may be one or more kinds of vinyl-based resin, cellulose-based resin, and acrylic-based resin, etc., for example. Examples of the vinyl-based resin may include polyvinyl alcohol, polyvinyl acetate, polyvinyl butyral, and polyvinyl chloride. Examples of the cellulose-based resin may include methyl cellulose, ethyl cellulose, and hydroxyethyl cellulose. Examples of the acrylic-based resin may include polyacrylate ester and polymethylmethacrylate.

It is to be noted that the thermally-decomposable polymer compound may be preferably dispersible or dissolvable in the ionic liquid. Further, when the layered-substance-containing solution contains other material (a solvent), the thermally-decomposable polymer compound may be preferably dispersible or dissolvable in the solvent.

The thermally-decomposable polymer is not particularly limited in its molecular weight (the weight-average molecular weight); however, the molecular weight of the thermally-decomposable polymer compound may be preferably from 600 to 70000 both inclusive, and may be more preferably from 2000 to 40000 both inclusive, for example. A reason for this is that the thermally-decomposable polymer compound is dispersed or dissolved easily thereby in the layered-substance-containing solution.

The thermally-decomposable polymer compound is not particularly limited in its content in the layered-substance-containing solution; however, the content of the thermally-decomposable polymer compound in the layered-substance-containing solution may be preferably from 5 wt % to 95 wt % both inclusive, and may be more preferably from 20 wt % to 75 wt % both inclusive.

It is to be noted that the polymer compound may include one or more kinds of polymer compounds that have both the properties of the hydrolyzable polymer compound and the properties of the thermally-decomposable polymer compound. Such a polymer compound is a so-called hyrolyzable thermally-decomposable polymer compound, and has the properties that cause the polymer compound to be decomposed as a result of a reaction with water and also has properties that cause the polymer compound to be decomposed as a result of heat.

<1-3. Layered Substance>

The layered substance is a layered thin substance as described above, and is a so-called nanosheet.

The layered substance is not limited to a single-layer layered substance, and may be a multilayer layered substance as long as the number of layers of the multilayer layered substance is sufficiently small. It is to be noted that the layered substance described below is a layered substance that has been peeled off from a laminate in a process of manufacturing the layered-substance-containing solution which will be described later. The laminate has a multilayer structure in which a plurality of layered substances are laminated. It is to be noted that the kind of the layered substance may be only one kind, or may be two or more kinds.

The layered substance may be a substance (a single-element layered substance) that includes only a single kind of element as a constituent element, or may be a substance (a multiple-element layered substance) that includes two or more kinds of elements as constituent elements. It is to be noted that, in the case of the multiple-element layered substances, part or all of the plurality of layers may include two or more kinds of elements as constituent elements.

The single-element layered substance is not particularly limited in its kind. Examples of the single-element layered substance may include graphite. Specific examples of the graphite may include natural graphite, expanded graphite, artificial graphite, and pyrolytic graphite.

The multiple-element layered substance is not particularly limited in its kind. Examples of the multiple-element layered substance may include metal chalcogenide, metal oxide•metal oxyhalide, metal phosphate, clay mineral silicate, double hydroxide, layered titanium oxide, layered perovskite oxide, and boron nitrides.

Specific examples of the metal chalcogenide may include MX (where M is any of Ga, Ge, In, etc., and X is any of S, Se, Te, etc.), $MX_2$ (where M is any of Ti, Zr, Hf, V, Nb, Ta, Mo, W, etc., and X is any of S, Se, Te, etc.), and $MPX_3$ (where M is any of Mg, V, Mn, Fe, Co, Ni, Zn, Cd, In, etc., and X is any of S, Se, Te, etc.).

Specific examples of the metal oxide•metal oxyhalide may include $M_xO_y$ (where M is any of Ti, Mn, Mo, V, etc.), $MOXO_4$ (where M is any of Ti, V, Cr, Fe, etc., and X is any of P, As, etc.), MOX (where M is any of Ti, V, Cr, Fe, etc., and X is any of Cl, Br, etc.), LnOCl (where Ln is any of Yb, Er, Tm, etc.), niobate represented by $K[Ca_2Na_{n-3}Nb_nO_{3n+1}]$ (where n satisfies 3≤n<7), and titanate. It is to be noted that specific examples of $M_xO_y$ may include $MoO_3$, $Mo_{18}O_{52}$, $V_2O_5$, $LiNbO_2$, and $Li_xV_3O_8$. Specific examples of the titanate may include $K_2Ti_4O_9$ and $KTiNbO_5$.

Specific examples of the metal phosphate may include $M(HPO_4)_2$ (where M is any of Ti, Zr, Ce, Sn, etc.) and $Zr(ROPO_3)_2$ (where R is any of H, Rh, $CH_3$, etc.).

Specific examples of the clay mineral•silicate may include a smectite group, a kaolin group, pyrophyllite-talc, vermiculite, a mica group, a brittle mica group, a chlorite group, sepiolite-palygorskite, imogolite, allophone, hisingerite, magadiite, and kanemite. It is to be noted that specific examples of the smectite group may include montmorillonite and saponite. Specific examples of the kaolin group may include kaolinite.

Specific examples of the double hydroxide may include $[M^{2+}_{1-x}M^{3+}_{x}(OH)_2]$ $[An^-]_{x/n} \cdot zH_2O$ (where $M^{2+}$ is any of $Mg^{2+}$, $Zn^{2+}$, etc., $M^{3+}$ is any of $Al^{3+}$, $Fe^{3+}$, etc., and $An^-$ is any anion).

Specific examples of the layered titanium oxide may include potassium dititanate ($K_2Ti_2O_5$) and potassium tetratitanate ($K_2Ti_4O_9$).

Specific examples of the layered perovskite oxide may include $KCa_2Nb_3O_{10}$, $KSr_2Nb_3O_{10}$, and $KLaNb_2O_7$.

The boron nitrides are a generic term for a compound containing nitrogen (N) and boron (B) as constituent elements. Specific examples of the boron nitrides may include boron nitride (BN) and boron carbon nitride (BCN).

It is to be noted that the layered substance is not particularly limited in its average particle diameter; however, in particular, the average particle diameter of the layered substance may be preferably 100 μm or smaller, and more preferably, from 1 μm to 100 μm both inclusive. A reason for this is that dispersibility, etc. of the layered substance are improved thereby. The average particle diameter is a so-called median diameter (D50 corresponding to 50% in a cumulative particle diameter distribution).

<1-4. Other Materials>

It is to be noted that the layered-substance-containing solution may contain one or more kinds of other materials together with the ionic liquid, the polymer compound, and the layered substance described above.

The other materials may include, for example, a solvent (excluding the ionic liquid). The solvent may be, for example, an aqueous solvent or an organic solvent. Specific examples of the aqueous solvent may include water and ethanol. The organic solvent is not particularly limited in its kind.

<2. Method of Manufacturing Layered-sub stance-containing Solution>

Next, a description is given of a method of manufacturing the foregoing layered-substance-containing solution. It is to be noted that a substance having a multilayer structure in which a plurality of layered substances are laminated is referred to as a "layered laminate" below.

<2-1. Preparation of Layered-substance-containing Solution>

When the layered-substance-containing solution is to be prepared, first, a solution (a layered-laminate-containing solution) that contains the ionic liquid, the polymer compound, and the layered laminate is prepared. In this case, the polymer compound is caused to include one or both of the hydrolyzable polymer compound and the thermally-decomposable polymer compound, as described above.

Specifically, for example, the polymer compound is added to the ionic liquid, and the polymer compound is dispersed or dissolved in the ionic liquid.

Subsequently, the layered laminate is added to the ionic liquid in which the polymer compound is dispersed or dissolved, and the layered laminate is thereby dispersed in the ionic liquid. In this case, the ionic liquid may be stirred on an as-necessary basis. Thus, the layered-laminate-containing solution is obtained.

Lastly, the layered-laminate-containing solution is irradiated with one or both of sonic waves and radio waves.

The sonic waves is not particularly limited in its kind; however, ultrasonic waves may be preferably used in particular. A reason for this is that the layered substance is thereby peeled off from the layered laminate more easily in the layered-laminate-containing solution. In a case where the ultrasonic waves are used, for example, any ultrasonic disperser may be used; however, a horn-type ultrasonic disperser may be preferably used in particular. Conditions of the ultrasonic waves such as frequency, amplitude, and irradiation time are not particularly limited. To give an example, the frequency may be from 10 kHz to 1 MHz both inclusive, the amplitude may be from 1 Lm to 100 Lm both inclusive (a zero-to-peak value), the irradiation time may be 1 minute or more, preferably, from 1 minute to 6 hours both inclusive.

The radio waves are not particularly limited in their kind; however, microwaves may be preferably used in particular. A reason for this is that the layered substance is thereby peeled off from the layered laminate more easily in the layered-laminate-containing solution. In a case where the microwaves are used, any microwave oven may be used, for example. Conditions of the microwaves such as output, frequency, and irradiation time are not particularly limited. To give an example, the output may be 500 W, the frequency may be 2.4 GHz, and the irradiation time may be 10 seconds or more, preferably, from 10 seconds to 10 minutes both inclusive. Alternatively, low-energy microwaves may be used under conditions that the output is from 1 W to 100 W both inclusive, the frequency is 2.4 GHz, and the irradiation time is from 0.2 hours to 48 hours both inclusive.

This irradiation process causes, in the layered-laminate-containing solution, one or more layered substances to be peeled from the layered laminate, and causes the one or more layered substances to be dispersed in the ionic liquid. The layered-substance-containing solution is obtained thereby. The layered laminate may or may not remain in the obtained layered-substance-containing solution.

It is to be noted that the amount by which the layered substance is peeled off, i.e., the concentration of the layered-substance-containing solution is controllable in the irradiation process by changing the foregoing irradiation conditions (frequency, etc.). It is therefore possible to obtain the layered-substance-containing solution at high concentration by so setting the irradiation conditions that the amount by which the layered substance is peeled off is increased. Specifically, an increase in irradiation time causes the amount by which the layered substance is peeled off to be increased, resulting in an increase in concentration of the layered-substance-containing solution. This may allow the maximum concentration of the layered-substance-containing solution to be 10 mg/cm$^3$ (=10 mg/ml) or higher, preferably, 20 mg/cm$^3$ (=20 mg/ml) or higher, and more preferably, 40 mg/cm$^3$ (=40 mg/ml) or higher.

Alternatively, lastly, the layered-laminate-containing solution is heated. In this case, the layered-laminate-containing solution may be preferably stirred. A reason for this is that the layered-laminate-containing solution is thereby evenly heated.

A method of heating is not particularly limited. Examples of the method of heating may include a method of directly heating the layered-laminate-containing solution (direct heating method), and a method of indirectly heating the layered-laminate-containing solution (indirect heating method). Upon using the direct heating method, for example, a device such as a heater may be put in a container that contains the layered-laminate-containing solution, and the layered-laminate-containing solution may be heated by means of the device such as the heater. Upon using the indirect heating method, for example, the container that contains the layered-laminate-containing solution may be heated by means of one or more kinds of heating instruments. As the heating instruments, for example, an oil bath, an oven, a hot plate, etc. may be used. Conditions such as a heating temperature and heating time are not particularly limited. To give an example, the heating temperature may be preferably from 70° C. to 300° C. both inclusive, and may be more preferably from 100° C. to 200° C. both inclusive. The heating time may be preferably from 0.1 hour to 50 hours both inclusive, and may be more preferably from 1 hour to 10 hours both inclusive.

This heating process causes, in the layered-laminate-containing solution, one or more layered substances to be peeled off from the layered laminate, and causes the one or more peeled-off layered substances to be dispersed in the ionic liquid. The layered-substance-containing solution is obtained thereby. The layered laminate may or may not remain in the obtained layered-substance-containing solution.

As described above, the layered-laminate-containing solution may be irradiated with sonic waves, etc., or the layered-laminate-containing solution may be heated, in order to obtain the layered-substance-containing solution. In particular, it may be preferable to heat the layered-laminate-containing solution. A reason for this is that the heating process is simpler than the irradiation process, therefore improving efficiency of obtaining the layered-substance-containing solution (productivity).

<2-2. Purification of Layered-substance-containing Solution>

The layered-substance-containing solution may be purified on an as-necessary basis, after the preparation of the layered-substance-containing solution.

Upon the purification of the layered-substance-containing solution, the layered substance may be purified in an isolated manner by a method such as centrifugation, Soxhlet method, and cross-flow filtration, for example. It is to be noted, however, that the purification of the layered-substance-containing solution may be performed by any other method.

In particular, the centrifugation may be preferable. A reason for this is that the layered substance is thereby purified in an isolated manner from the layered-substance-containing solution easily. In this case, for example, any centrifuge may be used, and any centrifugation condition may be set. The centrifugation process may separate the layered-substance-containing solution into a solid phase including the remained layered laminate, an impurity, etc. and a liquid phase (a supernatant liquid) including the layered substance, for example. It is to be noted that, in a case where the layered-substance-containing solution is subjected to centrifugation, only part of the layered-substance-containing solution may be subjected to the centrifugation, or all of the layered-substance-containing solution may be subjected to the centrifugation.

After the centrifugation process, the liquid phase may be collected from the layered-substance-containing solution. The impurities, etc. are thereby removed from the layered-substance-containing solution. The layered-substance-containing solution is thus purified. In this case, the concentration of the layered-substance-containing solution (purity of the layered substance) may be prepared by changing the centrifugation conditions.

<3. Workings and Effects>

According to the foregoing layered-substance-containing solution and the foregoing method of manufacturing the layered-substance-containing solution, the layered-laminate-containing solution containing the ionic liquid, the polymer compound (including one or both of the hydrolyzable polymer compound and the thermally-decomposable polymer compound), and the layered laminate is irradiated with sonic waves, etc., or the layered-laminate-containing solution is heated. In this case, the layered substance is peeled off from the layered laminate easily even with the use of only the simple processes that include the preparation process, the irradiation process, and the heating process performed on the layered-laminate-containing solution. This allows for high-concentration dispersion of the layered substance in the ionic liquid. In addition, the peeling off of the layered substance is stable and highly reproducible. This allows the number of layers of the layered substance to be even. Further, the layered substance is difficult to be broken upon the peeling off. This allows the area of the layered substance to be sufficiently large. Hence, it is possible to easily obtain a high-quality layered substance.

In particular, when the polymer compound includes the hydrolyzable polymer compound and the hydrolyzable polymer compound includes the ether bond, etc., it is easy for the layered substance to be peeled off from the layered laminate by the irradiation process and the heating process. Hence, it is possible to achieve higher effects.

Moreover, when the ultrasonic waves are used as the sonic waves and the microwaves are used as the radio waves upon the irradiation process, it is easier for the layered substance to be peeled off from the layered laminate. Hence, it is possible to achieve higher effects.

WORKING EXAMPLES

A detailed description is given below of working examples of the invention. An order of the description is as follows. It is to be noted that, however, an embodiment of the invention is not limited to embodiments to be described below.

1. Manufacturing of Layered-substance-containing Solution
2. Evaluation of Layered-substance-containing Solution <1. Manufacturing of Layered-Substance-Containing Solution>

Working Example 1

The layered-substance-containing solution was manufactured by the following procedures. In this example, a process of irradiating the layered-laminate-containing solution with radio waves (microwaves) was used as a method of peeling off the layered substance from the layered laminate.

First, 74 parts by mass of the ionic liquid (the following Compound 1) and 26 parts by mass of polyethylene glycol 1 (PEG-20000 available from Wako Pure Chemical Industries, Ltd., the weight average molecular weight=about 20000) as the polymer compound (the hydrolyzable polymer compound) were mixed with each other, and the hydrolyzable polymer compound was dissolved in the ionic liquid. Compound 1 is 1-butyl-3-methylimidazolium hexafluorophosphate (BMIM-PF$_6$).

[Chemical Formula 5]

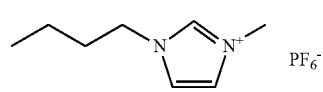

Compound 1

Thereafter, the layered laminate (natural graphite available from Wako Pure Chemical Industries, Ltd., 2θ=about 27°) was dispersed in the mixed liquid to obtain a mixture. In this case, the content of the layered laminate in the mixed liquid was 25 mg/cm$^3$ (=25 mg/ml). Subsequently, the mixture was grinded by means of a mortar (15 minutes) to obtain the layered-laminate-containing solution. It is to be noted that "2θ" described above indicates a position of a peak resulting from the presence of the layered laminate (a diffraction angle 2θ) in an analysis result (an XRD chart) obtained by an XRD method. The meaning of "2θ" is similarly applicable to the description below.

Thereafter, the layered-laminate-containing solution (0.60 g) was collected in a vial (0.5 cm$^3$=0.5 ml) for a microwave synthesis device (Initiator$^+$ available from Biotage Japan Ltd.), and the vial was sealed. Lastly, the layered-laminate-containing solution was irradiated with microwaves by means of the microwave synthesis device. In this case, the irradiation was performed at the temperature of 170° C. and for the irradiation time of 30 minutes. The layered-substance-containing solution was thereby obtained.

Working Example 2

The layered-substance-containing solution was obtained by procedures similar to the procedures of Working Example 1 except that no polymer compound (no hydrolyzable polymer compound) was used.

Working Example 3

A process of heating the layered-laminate-containing solution was used as the method of peeling off the layered substance from the layered laminate. In this case, procedures similar to the procedures in Working example 1 were performed except that the layered-laminate-containing solution was heated instead of irradiating the layered-laminate-containing solution with microwaves. Specifically, the layered-laminate-containing solution (5 cm$^3$=5 ml) was collected in an eggplant flask, and the eggplant flask was heated (6 hours) by means of an oil bath (130° C.) while stirring the oil.

Working Example 4

The layered-substance-containing solution was obtained by procedures similar to the procedures of Working example 3 except that the content of the layered laminate was changed to 200 mg/cm$^3$ (=200 mg/ml).

Working Example 5

The layered-substance-containing solution was obtained by procedures similar to the procedures of Working example 3 except that no polymer compound (no hydrolyzable polymer compound) was used. [Working Examples 6 to 36]

The layered-substance-containing solution was obtained by procedures similar to the procedures of Working examples 1, 3, and 4 except that the kind of the ionic liquid, the kind of the polymer compound, the kind of the layered laminate, the method of peeling off the layered laminate, etc. were changed.

The following Compound 2 to Compound 9 were used as the ionic liquid. Compound 2 is 1-methyl-3-butyllimidazolium chloride. Compound 3 is 1-butyl-3-methylimidazolium bis((trifluoromethl)sulfonyl)amide hexafluorophosphate. Compound 4 is 1-benzyl-3-methylimidazolium hexafluorophosphate. Compound 5 is 1,3-diethoxyimidazolium hexafluorophosphate. Compound 6 is 1,3-dipropargylimidazolium hexafluorophosphate. Compound 7 is 1-butyl-2,3-dimethylimidazolium hexafluorophosphate. Compound 8 is 1-(4-hydroxybutyl)-3-methylimidazolium hexafluorophosphate. Compound 9 is 1,1'-((ethane-1,2-diylbis(oxy))bis(ethane-2,1-diyl))bis(3-butylimidazolium) hexafluorophosphate.

[Chemical Formula 6]

Compound 2

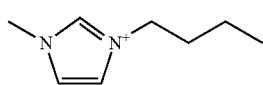

[Chemical Formula 7]

Compound 3

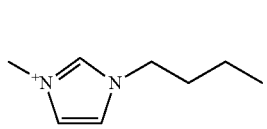

[Chemical Formula 8]

Compound 4

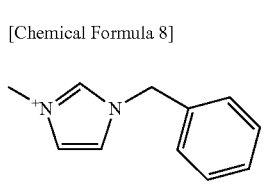

[Chemical Formula 9]

Compound 5

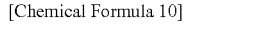

[Chemical Formula 10]

Compound 6

[Chemical Formula 11]

Compound 7

[Chemical Formula 12]

Compound 8

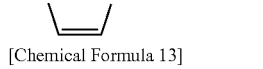

[Chemical Formula 13]

Compound 9

As the polymer compound (the hydrolyzable polymer compound), polyethylene glycol 2 (PEG-2000 available from Wako Pure Chemical Industries, Ltd., the weight average molecular weight=about 2000), polyethylene glycol 3 (PEG-600 available from Wako Pure Chemical Industries, Ltd., (the weight average molecular weight=about 600), polyethylene glycol 4 (PEG-6000 available from Wako Pure Chemical Industries, Ltd., the weight average molecular weight=about 6000), polyether polyol 1 (P-3000 available from Adeka Corporation, the weight average molecular weight=about 5000), polyether polyol 2 (SP-600 available from Adeka Corporation, the weight average molecular weight=about 400), diol-type polyalkylene glycol (PH-2000 available from Adeka Corporation, the weight average molecular weight=about 23000), methyl cellulose (10% aqueous solution (from 90 mPa·s to 110 mPa·s (5%, toluene: ethanol=8:20, 25° C.) available from Tokyo Chemical Industry Co., Ltd.), and guar gum (available from Sigma-Aldrich Japan Limited Liability Company, Ltd., the weight average molecular weight=from about 85000 to about 124000) were used.

As the polymer compound (the thermally-decomposable polymer compound), polyvinyl alcohol (PVA-217 available from Kuraray Co., Ltd.), polyvinyl acetate (50% methanol solution available from Wako Pure Chemical Industries, Ltd., a polymerization degree=1500), and polymethyl methacrylate (available from The Nippon Synthetic Chemical Industry Co., Ltd.) were used.

As the layered laminate, tin(IV) sulfide ($SnS_2$, 2θ=about 15°) available from Mitsuwa Chemical Co., Ltd., molybdenum telluride ($MoTe_2$, 2θ=about 12.6°) available from Mitsuwa Chemical Co., Ltd., germanium(II) sulfide (GeS, 2θ=about 34.1°) available from Mitsuwa Chemical Co., Ltd., zirconium sulfide ($ZrS_2$, 2θ=about 15.1°) available from Mitsuwa Chemical Co., Ltd., niobium selenide ($NbSe_2$, 2θ=about 14°) available from Mitsuwa Chemical Co., Ltd., synthetic mica (2θ=about 6.2°) available from Wako Pure Chemical Industries, Ltd., talc (2θ=about 9.4°) available from Wako Pure Chemical Industries, Ltd., and expanded graphite EC1500 (2θ=about 27°) available from Ito Graphite Co., Ltd were used.

<2. Evaluation of Layered-Substance-Containing Solution>

The layered-substance-containing solution was analyzed by an X-ray diffraction (XRD) method (a concentration method). In this case, each of the layered-substance-containing solution before being subjected to the irradiation process, the layered-substance-containing solution after being subjected to the irradiation process, the layered-substance-containing solution before being subjected to the heating process, and the layered-substance-containing solution after being subjected to the heating process was applied to a surface of a sample plate to prepare a sample for analysis.

As an analysis result (an XRD chart) obtained by the XRD method, a peak resulting from the presence of the layered laminate was detected in the vicinity of the foregoing value of 2θ for each kind of the layered laminate.

The intensity of the peak after the irradiation process and after the heating process was examined on the basis of the XRD chart, and results described in Tables 1 to 3 were obtained thereby. In this case, a converted value of intensity (normalized intensity) of the peak after the irradiation process and after the heating process was calculated on the basis of the intensity of peak before the irradiation process and before the heating process as 100.

TABLE 1

| | | Layered-laminate-containing solution | | | | Layered-substance-containing solution |
|---|---|---|---|---|---|---|
| | | Polymer compound | | Layered | | |
| Working example | Ionic liquid | Hydrolyzable | Thermally-decomposable | laminate (Content) | Peeling method | Normalized intensity |
| 1 | Compound 1 | Polyethylene glycol 1 | — | Natural graphite (25 mg/cm³) | Irradiation process | 10 |
| 2 | Compound 1 | — | — | Natural graphite (25 mg/cm³) | Irradiation process | 100 |
| 3 | Compound 1 | Polyethylene glycol 1 | — | Natural graphite (25 mg/cm³) | Heating process | 34 |
| 4 | Compound 1 | Polyethylene glycol 1 | — | Natural graphite (200 mg/cm³) | Heating process | 31 |
| 5 | Compound 1 | — | — | Natural graphite (25 mg/cm³) | Heating process | 100 |
| 6 | Compound 1 | Polyethylene glycol 2 | — | Natural graphite (25 mg/cm³) | Irradiation process | 58 |
| 7 | Compound 1 | Polyethylene glycol 3 | — | Natural graphite (25 mg/cm³) | Irradiation process | 55 |
| 8 | Compound 1 | Polyether polyol 1 | — | Natural graphite (25 mg/cm³) | Irradiation process | 18 |
| 9 | Compound 1 | Polyether polyol 2 | — | Natural graphite (25 mg/cm³) | Irradiation process | 24 |
| 10 | Compound 1 | Diol-type polyalkylene glycol | — | Natural graphite (25 mg/cm³) | Irradiation process | 73 |
| 11 | Compound 1 | Methyl cellulose | — | Natural graphite (25 mg/cm³) | Irradiation process | 34 |

TABLE 1-continued

| | Layered-laminate-containing solution | | | | Layered-substance-containing solution |
|---|---|---|---|---|---|
| | | Polymer compound | | Layered | |
| Working example | Ionic liquid | Hydrolyzable | Thermally-decomposable | laminate (Content) | Peeling method | Normalized intensity |
| 12 | Compound 1 | — | Polyvinyl alcohol | Natural graphite (25 mg/cm³) | Irradiation process | 72 |
| 13 | Compound 1 | Guar gum | — | Natural graphite (25 mg/cm³) | Irradiation process | 61 |

TABLE 2

| | Layered-laminate-containing solution | | | | | Layered-substance-containing solution |
|---|---|---|---|---|---|---|
| | | Polymer compound | | | | |
| Working example | Ionic liquid | Hydrolyzable | Thermally-decomposable | Layered laminate (Content) | Peeling method | Normalized intensity |
| 14 | Compound 1 | — | Polyvinyl acetate | Natural graphite (25 mg/cm³) | Irradiation process | 70 |
| 15 | Compound 1 | — | Polymethyl methacrylate | Natural graphite (25 mg/cm³) | Irradiation process | 52 |
| 16 | Compound 1 | Polyethylene glycol 1 | — | Tin(IV) sulfide (25 mg/cm³) | Irradiation process | 47 |
| 17 | Compound 1 | Polyethylene glycol 1 | — | Molybdenum telluride (25 mg/cm³) | Irradiation process | 49 |
| 18 | Compound 1 | Polyethylene glycol 1 | — | Germanium(II) sulfide (25 mg/cm³) | Irradiation process | 6 |
| 19 | Compound 1 | Polyethylene glycol 1 | — | Zirconium sulfide (25 mg/cm³) | Irradiation process | 0 |
| 20 | Compound 1 | Polyethylene glycol 1 | — | Niobium selenide (25 mg/cm³) | Irradiation process | 45 |
| 21 | Compound 1 | Polyethylene glycol 1 | — | Synthetic mica (25 mg/cm³) | Irradiation process | 24 |
| 22 | Compound 1 | Polyethylene glycol 1 | — | Talc (25 mg/cm³) | Irradiation process | 59 |
| 23 | Compound 1 | Polyethylene glycol 1 | — | Expanded graphite (65 mg/cm³) | Irradiation process | 49 |
| 24 | Compound 2 | Polyethylene glycol 1 | — | Natural graphite (25 mg/cm³) | Irradiation process | 23 |
| 25 | Compound 3 | Polyethylene glycol 1 | — | Natural graphite (25 mg/cm³) | Irradiation process | 8 |
| 26 | Compound 4 | Polyethylene glycol 1 | — | Natural graphite (25 mg/cm³) | Irradiation process | 9 |

TABLE 3

| | Layered-laminate-containing solution | | | | | Layered-substance-containing solution |
|---|---|---|---|---|---|---|
| | | Polymer compound | | Layered | | |
| Working example | Ionic liquid | Hydrolyzable | Thermally-decomposable | laminate (Content) | Peeling method | Normalized intensity |
| 27 | Compound 5 | Polyethylene glycol 1 | — | Natural graphite (25 mg/cm³) | Irradiation process | 12 |

TABLE 3-continued

| | Layered-laminate-containing solution | | | | Layered-substance-containing solution |
|---|---|---|---|---|---|
| | | Polymer compound | | Layered | |
| Working example | Ionic liquid | Hydrolyzable | Thermally-decomposable | laminate (Content) | Peeling method | Normalized intensity |
| 28 | Compound 6 | Polyethylene glycol 1 | — | Natural graphite (25 mg/cm$^3$) | Irradiation process | 10 |
| 29 | Compound 7 | Polyethylene glycol 1 | — | Natural graphite (25 mg/cm$^3$) | Irradiation process | 8 |
| 30 | Compound 8 | Polyethylene glycol 1 | — | Natural graphite (25 mg/cm$^3$) | Irradiation process | 25 |
| 31 | Compound 9 | Polyethylene glycol 1 | — | Natural graphite (25 mg/cm$^3$) | Irradiation process | 13 |
| 32 | Compound 9 | Polyethylene glycol 2 | — | Natural graphite (100 mg/cm$^3$) | Irradiation process | 73 |
| 33 | Compound 9 | Polyethylene glycol 3 | — | Natural graphite (100 mg/cm$^3$) | Irradiation process | 55 |
| 34 | Compound 9 | Polyethylene glycol 4 | — | Natural graphite (100 mg/cm$^3$) | Irradiation process | 16 |
| 35 | Compound 9 | Polyethylene glycol 1 | — | Natural graphite (100 mg/cm$^3$) | Irradiation process | 13 |
| 36 | Compound 9 | Polyethylene glycol 1 | — | Natural graphite (100 mg/cm$^3$) | Heating process | 35 |

In the case where the layered-laminate-containing solution included no polymer compound (no hydrolyzable polymer compound and no thermally-decomposable polymer compound) (Working examples 2 and 5), the normalized intensity remained at 100 independently of the peeling method (the irradiation process or the heating process). This result shows that the intensity of the peak resulting from the presence of the layered laminate did not change even through the irradiation process or the heating process. In other words, the layered substance was not peeled off from the layered laminate in the layered-laminate-containing solution.

In contrast, in the case where the layered-laminate-containing solution included the polymer compound (the hydrolyzable polymer compound or the thermally-decomposable polymer compound) (Working examples 1, 3, 4, and 6 to 36), the normalized intensity was smaller than 100 independently of the kind of the layered laminate and the peeling method. This result shows that the intensity of the peak resulting from the presence of the layered laminate was decreased through the irradiation process or the heating process. In other words, the layered substance was peeled off from the layered laminate in the layered-laminate-containing solution.

In particular, in the case where the layered-laminate-containing solution included the polymer compound, the normalized intensity was decreased more in the case where the irradiation method was used as the peeling method (Working example 1) than a case where the heating process was used as the peeling method (Working example 3). In other words, the layered substance was peeled off by a greater amount from the layered laminate by using the heating process as the peeling method.

It is to be noted that specific verification was not performed for a case where both the hydrolyzable polymer compound and the thermally-decomposable polymer compound were used. The layered substance is, however, peeled off from the layered laminate more easily in the case where the hydrolyzable polymer compound is used, as described above. Similarly, the layered substance is peeled off from the layered laminate more easily also in the case where the thermally-decomposable polymer compound is used. Further, taking into consideration the foregoing tendency that the layered substance is easier to be peeled off from the layered laminate, no particular reason can be found that the layered substance become more difficult to be peeled off from the layered laminate in the case where both the hydrolyzable polymer compound and the thermally-decomposable polymer compound are used. Accordingly, it can be presumed that the layered substance becomes easier to be peeled off from the layered laminate also in the case where both the hydrolyzable polymer compound and the thermally-decomposable polymer compound are used.

On the basis of the foregoing results, the layered substance was obtained easily when the layered-laminate-containing solution including the ionic liquid, the polymer compound (including one or both of the hydrolyzable polymer compound and the thermally-decomposable polymer compound), and the layered laminate was irradiated with radio waves, etc, or the layered-laminate-containing solution was heated.

The invention has been described above with reference to the embodiments and the working examples: however, the invention is not limited to the examples described in the embodiments and the working examples, and may be modified in a variety of ways.

The present application is based on and claims priority from Japanese Patent Application No. 2015-054556 filed with the Japan Patent Office on Mar. 18, 2015, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

The invention claimed is:

1. A layered-substance-containing solution comprising a mixture of:
   an ionic liquid;
   a polymer compound including a polyalkylene glycol as a hydrolyzable polymer compound and optionally a thermally-decomposable polymer compound; and
   a layered substance, wherein
   the polyalkylene glycol is polypropylene glycol or polytetramethylene glycol,
   and the polyalkylene glycol has a weight-average molecular weight of from 600 to 70000, both inclusive.

2. The layered-substance-containing solution according to claim 1, wherein
   the thermally-decomposable polymer compound is present and includes at least one of compounds each causing a decrease in weight at a temperature of 180 degrees Celsius or lower when the weight is measured by thermogravimetry (TG: Thermogravimetry).

3. The layered-substance-containing solution according to claim 1, wherein the weight-average molecular weight of the polyalkylene glycol is from 2000 to 40000, both inclusive.

4. The layered-substance-containing solution according to claim 1, wherein the polyalkylene glycol is present in an amount of from 5 wt % to 95 wt %, both inclusive, of the layered-substance-containing solution.

5. The layered-substance-containing solution according to claim 4, wherein the amount of the polyalkylene glycol is from 20 wt % to 75 wt %, both inclusive, of the layered-substance-containing solution.

6. The layered-substance-containing solution according to claim 1, wherein the ionic liquid is present in an amount of from 5 wt % to 98 wt %, both inclusive, of the layered-substance-containing solution.

7. The layered-substance-containing solution according to claim 6, wherein the amount of the ionic liquid is from 25 wt % to 80 wt %, both inclusive, of the layered-substance-containing solution.

8. The layered-substance-containing solution according to claim 1, wherein the layered substance is natural or expanded graphite.

9. The layered-substance-containing solution according to claim 1, wherein the layered substance is a multiple-element layered substance selected from the group consisting of metal chalcogenide, metal oxide, metal oxyhalide, metal phosphate, clay mineral, silicate, double hydroxide, layered titanium oxide, layered perovskite oxide, and boron nitrides.

* * * * *